United States Patent
Bouvigne

(10) Patent No.: US 12,317,041 B2
(45) Date of Patent: May 27, 2025

(54) CONTROL BY SLIDING VIRTUAL BUTTONS

(71) Applicant: SAGEMCOM BROADBAND SAS, Rueil Malmaison (FR)

(72) Inventor: Gabriel Bouvigne, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 129 days.

(21) Appl. No.: 17/732,284

(22) Filed: Apr. 28, 2022

(65) Prior Publication Data

US 2022/0353611 A1    Nov. 3, 2022

(30) Foreign Application Priority Data

Apr. 30, 2021    (FR) ...................................... 2104552

(51) Int. Cl.
| | |
|---|---|
| *H04R 3/00* | (2006.01) |
| *G06F 3/0488* | (2022.01) |
| *G06F 3/16* | (2006.01) |
| *H04R 5/02* | (2006.01) |

(52) U.S. Cl.
CPC ........... *H04R 3/005* (2013.01); *G06F 3/0488* (2013.01); *G06F 3/167* (2013.01); *H04R 5/02* (2013.01); *H04R 2205/024* (2013.01)

(58) Field of Classification Search
CPC .... H04R 3/005; H04R 5/02; H04R 2205/024; G06F 3/0488; G06F 3/167
USPC ................................ 381/56, 58, 91, 122, 124
See application file for complete search history.

(56) References Cited

U.S. PATENT DOCUMENTS

| | | | |
|---|---|---|---|
| 10,147,441 B1 | 12/2018 | Pogue et al. | |
| 2014/0033137 A1* | 1/2014 | Song ..................... | G06F 3/0425 715/863 |
| 2015/0293599 A1* | 10/2015 | Shih ........................ | G06F 3/017 345/173 |
| 2017/0199643 A1* | 7/2017 | Schnyder ............. | H04R 25/558 |

FOREIGN PATENT DOCUMENTS

| | | |
|---|---|---|
| EP | 2 393 305 A2 | 12/2011 |
| EP | 3149966 A1 | 4/2017 |

* cited by examiner

*Primary Examiner* — William A Jerez Lora
(74) *Attorney, Agent, or Firm* — MUNCY, GEISSLER, OLDS & LOWE, P.C.

(57) ABSTRACT

Audio playback equipment includes microphones, a loudspeaker, emitter means arranged to emit a sound detection signal, and at least one processor component arranged: to acquire detection audio signals produced by the microphones as a result of picking up the detection sound signal; from the audio detection signals, to detect a run of maskings in which at least two distinct microphones are masked in succession; to analyze a detected run of maskings so as to detect a command slide made by a user on the housing via at least two distinct microphones; and to cause at least one predetermined action to take place as a result of detecting said command slide.

21 Claims, 4 Drawing Sheets

CONTROL BY SLIDING VIRTUAL BUTTONS

The invention relates to the field of audio playback equipment including at least one loudspeaker and microphones.

BACKGROUND OF THE INVENTION

Some recent electronic equipment incorporates not only one or more loudspeakers for playing back audio signals, but also one or more microphones for picking up sound signals, and such equipment is capable of interacting with the user by means of voice. Such equipment can thus acquire commands given orally by the user, and can respond by emitting sound signals back to the user.

For example, smartspeakers are known that can be used to perform the voice recognition process of a virtual personal assistant. Also by way of example, decoder units (or "set-top boxes") are known that incorporate a voice assistant device.

Conventionally, such equipment performs a beamforming process that enables it to focus the direction in which it listens while ignoring sounds coming from directions other than the direction of the user. The beamforming process requires a plurality of microphones.

Such equipment also generally includes one or more buttons for giving rapid access to certain functions: starting voice interaction with the user, activating or deactivating a standby mode, switching on/off, adjusting volume, Bluetooth pairing, etc.

OBJECT OF THE INVENTION

An object of the invention is to reduce the cost of audio equipment as described above and to improve user interaction with said audio playback equipment.

SUMMARY OF THE INVENTION

In order to achieve this object, there is provided audio playback equipment comprising:
- a housing having holes formed therein, and microphones positioned inside the housing, each microphone being in acoustic communication with the outside via a respective one of the holes;
- a loudspeaker;
- emitter means arranged to emit an emitted sound detection signal via the loudspeaker; and
- at least one processor component arranged:
  - to acquire audio detection signals produced by the microphones as a result of picking up the sound detection signal;
  - from the audio detection signals, to detect a run of maskings in which at least two distinct microphones are masked in succession;
  - to analyze the run of maskings so as to detect a command slide made by a user on the housing via at least two distinct microphones; and
  - to cause at least one predetermined action to take place as a result of detecting said command slide.

The audio playback equipment of the invention thus includes "virtual buttons", each comprising a microphone and a hole via which the microphone communicates with the outside.

The virtual buttons enable the user to cause the predetermined actions to take place by sliding a finger on the housing of the audio playback equipment.

With electrical equipment that is already provided with microphones and a loudspeaker that are used for some other function, as applies to a smartspeaker that can be used for performing the voice recognition process of a virtual personal assistant, implementing these virtual buttons is very inexpensive since the virtual buttons can make use of the "pre-existing" microphones and loudspeaker. The cost of manufacturing the equipment is thus reduced considerably.

It is also possible to act "a posteriori" to add additional virtual buttons to equipment that has already been designed, or even that has already been deployed.

Since giving a command requires a finger to be slid on the housing, there is no need to tap on the housing. Thus, achieving detection depends neither on the characteristics of the finger (and in particular on the length of its fingernail) nor on the force with which the finger taps the housing.

Furthermore, detection does not require room noise to be at any particular level, and it functions even if the surroundings are completely silent.

It should also be observed that giving a command by sliding is particularly well suited for progressive-response actions, e.g. such as adjusting the volume of sound playback. Interactions between the user and the audio playback equipment are thus improved.

There is also provided audio playback equipment as described above, wherein the processor component is arranged:
- to detect a first masking of a first microphone;
- if a first duration of the first masking is less than a first predefined duration, to detect a second masking of a second microphone distinct from the first microphone; and
- if a second duration between the end of the first masking and the beginning of the second masking is less than a second predefined duration, to detect the command slide.

There is also provided audio playback equipment as described above, wherein the processor component is arranged to compare the command slide with at least one predefined slide in a predefined list, in order to determine a particular predefined slide that corresponds to the command slide, and in order to cause at least one predetermined action that is associated with the particular predefined slide to take place.

There is also provided audio playback equipment as described above, wherein each predefined slide corresponds to a predefined run of maskings of microphones that are arranged in succession.

There is also provided audio playback equipment as described above, wherein the microphones are in alignment, and the predefined slides are linear slides.

There is also provided audio playback equipment as described above, wherein the microphones are arranged in circular manner, and the predefined slides are circular slides.

There is also provided audio playback equipment as described above, wherein at least one predefined slide that is associated with a particular predetermined action is defined in such a manner as to begin necessarily by masking a predefined initial microphone and/or in such a manner as to end necessarily by masking a predefined final microphone.

There is also provided audio playback equipment as described above, wherein the predefined list comprises a plurality of predefined slides that are in the same direction but of lengths that are different.

There is also provided audio playback equipment as described above, wherein the predetermined action associated with at least one of the predefined slides is a progressive-response action.

There is also provided audio playback equipment as described above, wherein the progressive-response action has a response level that depends on the length of said predefined slide.

There is also provided audio playback equipment as described above, wherein the predefined slides comprise predefined slides in a first direction and predefined slides in a second direction, a predefined slide in the first direction being associated with increasing a response level of the progressive-response action, and a predefined slide in the second direction being associated with reducing the response level of the progressive-response action.

There is also provided audio playback equipment as described above, wherein variation in the response level of the progressive-response action is greater if the predefined slide is followed by the masking of a microphone being maintained at the end of the predefined slide.

There is also provided audio playback equipment as described above, wherein the progressive-response action is adjusting the volume of sound being played back by the audio playback equipment.

There is also provided audio playback equipment as described above, including a sensory emitter arranged to supply the user with sensory feedback that is representative of the command slide and/or of the response level of the predetermined action.

There is also provided audio playback equipment as described above, wherein the sensory emitter is arranged to emit a sensory feedback signal when the response level of the predetermined action crosses a predefined level or reaches a maximum or minimum end stop.

There is also provided audio playback equipment as described above, wherein the sensory emitter is arranged to emit a sensory feedback signal that depends on the path travelled by a user's finger on the housing while making a command slide.

There is also provided audio playback equipment as described above, wherein the sensory emitter is a light emitter.

There is also provided audio playback equipment as described above, wherein the sensory emitter is a sound emitter.

There is also provided audio playback equipment as described above, wherein the audio playback equipment is a smartspeaker.

There is also provided a control method for controlling audio playback equipment as described above; the method comprising the steps of:
  emitting the sound detection signal via the loudspeaker;
  acquiring the audio detection signals produced by the microphones;
  from the audio detection signals, detecting a run of maskings in which at least two distinct microphones are masked in succession;
  analyzing the run of maskings so as to detect a command slide made by the user on the housing via the at least two distinct microphones; and
  causing the predetermined action to take place as a result of detecting the command slide.

There is also provided a computer program including instructions for causing a processor component of the audio playback equipment as described above to execute the steps of the control method as described above.

There is also provided a computer-readable storage medium, having recorded thereon the computer program as described above.

The invention can be better understood in the light of the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
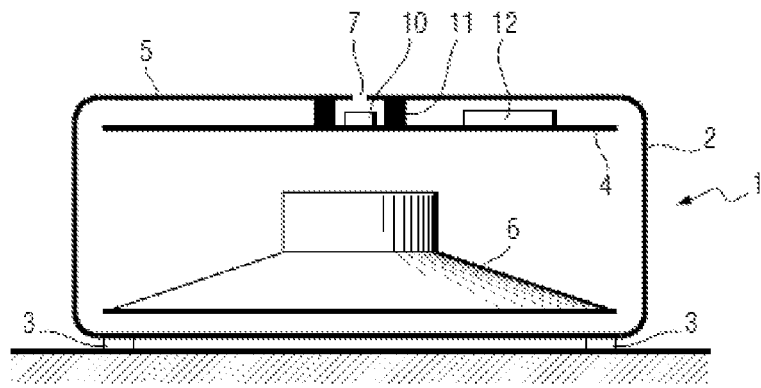
FIG. 1 shows a smartspeaker of the invention.

With reference to FIG. 1, in this example the audio playback equipment of the invention is a smartspeaker 1 that is used to perform the voice recognition process of a virtual personal assistant.

The smartspeaker 1 comprises firstly a housing 2. The term "housing" is used herein to mean the physical shell containing inside it the control components of the smartspeaker 1 as described below. The housing 2 may comprise a plurality of portions and it may optionally include one or more potentially removable covers. The housing 2 may comprise one or more portions that are rigid, flexible, made of metal, made of plastic, made of fabric, made of foam, etc.

The housing 2 also includes feet 3 that stand on any support (e.g. a table or any other piece of furniture) when the smartspeaker 1 is in its nominal operating position, as shown in FIG. 1.

The smartspeaker 1 also includes an internal chassis (not shown in figures) incorporated inside the housing 2.

The smartspeaker 1 also includes an electric circuit card 4. The circuit card 4 is incorporated in the housing 2 by being fastened to the internal chassis. The circuit card 4 is positioned parallel to the top face 5 of the housing 2 and in its proximity. The distance between the circuit card 4 and the top face 5 of the housing 2 may lie in the range 5 millimeters (mm) to 1.5 centimeters (cm), for example.

The smartspeaker 1 also includes a loudspeaker 6 that is incorporated in the housing 2 by being fastened to the internal chassis. In this example, the loudspeaker 6 is "pointing downwards", i.e. when the smartspeaker 1 is in its nominal operating position, it presents a directivity pattern that is downwardly oriented.

A plurality of holes 7 are formed in the top face 5 on the housing 2 (only one hole is shown in FIG. 1). Each hole 7 passes through the housing 2.

It should be observed that the holes 7 could also be made in the side faces of the housing 2, i.e. in the sides of the housing 2, and they can be made in any of the portions of the housing 2 (e.g. in a removable cover).

The smartspeaker 1 also has a plurality of microphones 10 (only one microphone 10 is shown in FIG. 1), and in this example the microphones are surface mounted components (SMCs). The microphones 10 are mounted on the printed circuit of the circuit card 4. Each microphone 10 is positioned inside the housing 2 and is in the proximity of a respective one of the holes 7 in such a manner that the sensitive portion of said microphone 10 is in acoustic communication with the outside via said hole 7. In this example, each microphone 10 is positioned in register with a respective hole 7 so that the axis of the hole 7 passes through the center of the microphone 10.

It should be observed that the directivity pattern of the loudspeaker 6 points towards a zone that does not include a microphone 10: in this example, the microphones 10 are positioned in a top portion of the smartspeaker 1.

Sound insulating material is placed around each microphone 10 between the circuit card 4 and the housing 2. In this example, the sound insulating material is foam 11. The foam 11 serves to limit sound disturbances picked up by the microphone 10 and coming from the inside of the smartspeaker 1. By way of example, such sound disturbances comprise the sound signals emitted by the loudspeaker 6 and interfering resonances inside the smartspeaker 1.

The microphones 10 are acoustically isolated from one another.

Likewise, the circuit card 4 is fastened to the internal chassis of the smartspeaker 1 via a fastener part (not shown) made of flexible material. By way of example, the fastener part is a "Silentblock", which, by way of example, is a part comprising natural rubber or elastomer and serving to absorb vibration and noise.

The fastener part serves to limit any direct transmission of vibration from the loudspeaker 6 to the microphones 10 via the internal chassis.

The smartspeaker 1 also includes emitter means and processor means.

The emitter means comprise electronic components, e.g. including an amplifier.

The processor means comprise at least a processor component 12 adapted to execute instructions of programs in order to perform the various steps of the processing method, the detection method, and the control method as described below. The processor component 12 is connected to at least one memory in which the programs are stored. By way of example, the processor component 12 is a general-purpose processor, a processor specialized in signal processing (known as a digital signal processor (DSP)), a microcontroller, or indeed a programmable logic circuit such as a field programmable gate array (FPGA) or an application-specific integrated circuit (ASIC). In this example, the processor component 12 is mounted on the circuit card 4.

The smartspeaker 1 has a plurality of virtual buttons situated on the top face 5 on the housing 2: each virtual button includes a respective microphone 10 and its associated hole 7.

The virtual buttons enable the user of the smartspeaker 1 to give commands for predetermined actions by making command gestures.

A command gesture may be a command press or a command slide (or a succession of command presses and of command slides).

For the user, a command press consists in masking a microphone 10 by placing a finger on or in the immediate proximity of the hole 7 associated with the microphone 10.

The term "on or in the immediate proximity" is used to mean that the finger is placed on the hole 7 and covers it in full or in part, or else that the finger has been brought above the hole 7 and is at a short distance therefrom, e.g. lying in the range 0 to 10 mm.

For the user, a command slide consists in sliding a finger on the housing 2 past a plurality of different microphones 10 in succession. A command slide thus masks at least two different microphones 10 in succession.

Below, the description begins with how the virtual button operates, and how a command press on said virtual button is detected.

The emitter means act via the loudspeaker 6 to emit an emitted sound detection signal continuously (i.e. so long as the smartspeaker 1 is activated). The microphone 10 of the virtual button picks up the sound detection signal and from the sound detection signal it has picked up it produces an audio detection signal.

The processor component 12 acquires the audio detection signal, and using the audio detection signal it acts in real time to detect whether the microphone 10 is or is not masked.

Specifically, when a finger (or any other object) is positioned on the hole 7 or in its immediate proximity, the sound detection signal picked up by the microphone 10 is highly attenuated, i.e. the energy or the instantaneous power of the sound detection signal as picked up is greatly diminished. The processor component 12 detecting this attenuation serves to detect the presence of the user's finger.

Using the foam 11 and the Silentblock damper while also having the directivity pattern of the loudspeaker 6 pointing downwardly towards a zone that does not contain the microphone 10 serves to ensure that the microphone 10 does not pick up the emitted sound detection signal as a result of it propagating through the inside of the housing 2, but picks it up solely as a result of it propagating via the outside of the housing 2. The energy level of the received sound signal as picked up (and thus of the audio detection signal) and variation of that level depend solely on whether or not an object is positioned on or in the immediate proximity of the hole 7.

The sound detection signal is a predetermined sound signal, e.g. a sinewave signal of constant frequency and amplitude.

The sound detection signal is a signal that is normally inaudible for a human being. The frequency of the sound detection signal lies within the operating ranges of the loudspeaker 6 and of the microphone 10.

By way of example, the frequency of the sound detection signal is equal to 22 kilohertz (kHz). Specifically, the frequency range of human hearing typically extends from 20 hertz (Hz) to 20 kHz, such that a frequency of 22 kHz is inaudible. Also, consumer audio processing appliances (such as the smartspeaker 1) typically have a sampling frequency of 48 kHz, and are therefore capable of processing signals of frequencies below 24 kHz.

In the event that the smartspeaker 1 is not capable of reproducing frequencies situated above 20 kHz via the loudspeaker 6 or of via the microphone 10, the signal could equally well be situated in the range of frequencies that is audible for a human, but at a level that is too low to be heard.

The curve plotting the absolute threshold of hearing (ATH) of a human (20 years old and with unimpaired hearing) can be modelled with the following equation, which is used for example by several digital audio encoders:

$$ATH=3.64*f^{(-0.8)}-6.8*e^{(-0.6*(f-3.4)^2)}+6*e^{(-0.15*(f-8.7)^2)}+0.6*0.001*f^4;$$

where f is the frequency (in kHz), and ATH is the absolute threshold of hearing (in dB).

The following equation is equivalent:

$$ATH=3.640*pow(f,-0.8)-6.800*exp(-0.6*pow(f-3.4,2.0))+6.000*exp(-0.15*pow(f-8.7,2.0))+0.6*0.001*pow(f,4.0).$$

Figure 2:
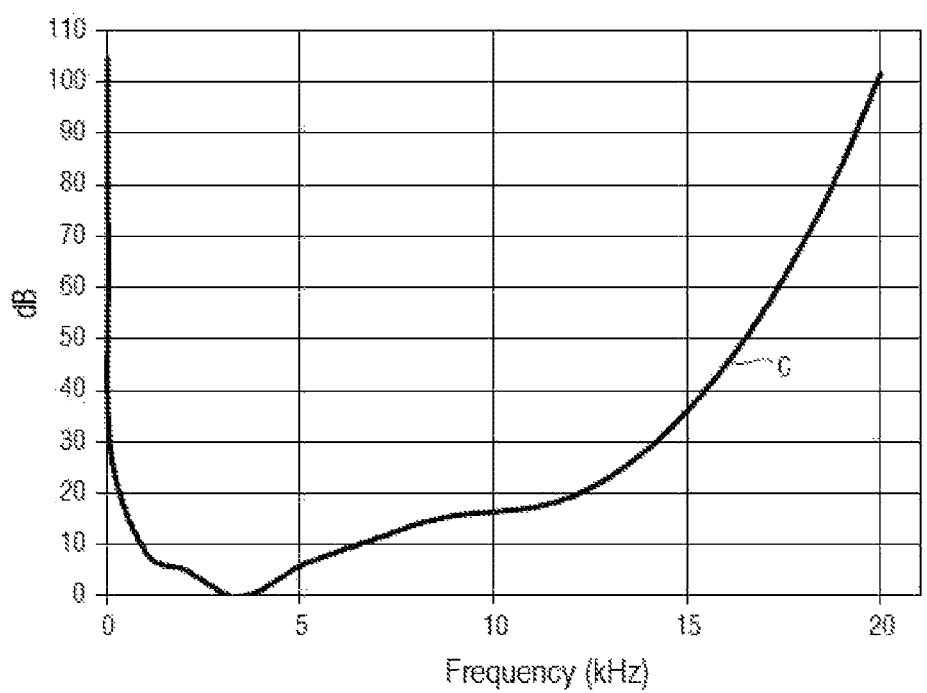
FIG. 2 shows a graph plotting a curve for the absolute threshold of hearing.

The curve C plotting the absolute threshold of hearing can be seen in FIG. 2.

It can be seen that the sensitivity of the human ear decreases strongly at high frequencies. For example, a signal at a frequency of 17 kHz requires a power that is about 55 dB above the minimum level in order to reach the threshold of hearing. It is thus entirely possible to use a sound detection signal at a frequency equal to 17 kHz and at a level equal to 20 dB: such a sound detection signal can indeed be picked up by the microphone 10, while remaining well below the curve for the absolute threshold of hearing.

Advantageously, the sound detection signal is modulated so as to be easily distinguished from background noise. For example, the sound detection signal comprises a run of signals of non-zero amplitude and of signals of zero amplitude. The durations of the intervals comprising the signals of non-zero amplitude and of the intervals comprising the signals of zero amplitude may be variable.

By way of example, the sound detection signal may be made up of the following sequence, that is repeated "indefinitely":
- a 22 kHz sinewave for 5 milliseconds (ms) (thus belonging to the signals of non-zero amplitude);
- silence for 5 ms (thus belonging to the silences);
- a 22 kHz sinewave for 5 ms (thus belonging to the signals of non-zero amplitude); and
- silence for 10 ms (thus belonging to the silences).

The microphone 10 samples the sound detection signal that it picks up and produces the audio detection signal. The processor component 12 acquires the sound detection signal continuously.

Under all circumstances, the signal is identified by its signature frequency (whether or not it is modulated).

Figure 3:
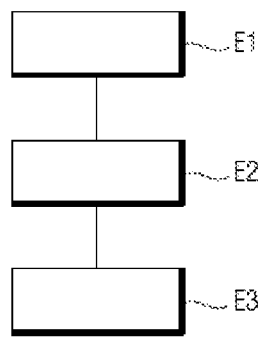
FIG. 3 shows steps of a method of processing an audio detection signal produced by a microphone.

With reference to FIG. 3, the processor component 12 then performs a processing method on the audio detection signal in order to detect whether or not the user has placed a finger on or in the immediate proximity of the hole 7, and thus whether or not the microphone 10 is masked.

Firstly, the processor component 12 applies a relatively narrow and selective bandpass filter around the frequency of the sound detection signal (step E1).

For example, when the sound detection signal has a frequency of 22 kHz, the microphone 10 samples of the sound detection signal as picked up at a frequency of 48 kHz in order to produce a sampled audio detection signal. By way of example, the processor component 12 applies the following filter to the sampled signal in order to obtain a filtered signal:

$$y(t)=0.00995 \times (x(t)-x(t-2))-1.9125 \times y(t-1)-0.9801 \times y(t-2)$$

where x(t) represents the sampled signal at the instant t and y(t) represents the filtered signal at the instant t.

Thereafter, the processor component 12 calculates the instantaneous power of the audio detection signal by calculating the average of $y(t)^2$ over a short length of time (e.g. 1 ms)—step E2.

At time t, the processor component 12 thus evaluates the instantaneous power P(t) that is then present of the audio detection signal as produced by the microphone 10.

The processor component 12 then compares the present instantaneous power P(t) with a past instantaneous power P(t−T0). T0 lies in the range 1 ms to 500 ms. In this example, T0 is equal to 25 ms.

If the ratio between the present instantaneous power and the past instantaneous power is less than a predetermined power threshold, then the processor component 12 deduces that access to the hole 7 has been shut off, at least in part, and thus that a finger is placed on or in the immediate proximity of the hole 7 and that the microphone 10 is masked (step E3).

In this example, the predetermined power threshold is equal to 25%, i.e. if the present instantaneous power is less than 25% of the past instantaneous power, then the processor component 12 considers that a finger is positioned on or in the immediate proximity of the hole 7.

In this example, the processor component 12 detects a command press when the microphone 10 has been masked and then the microphone 10 has been released. This is not essential: the processor component 12 could detect a command press as soon as the microphone 10 is masked.

When the processor component 12 has detected a command press, the processor component 12 causes the corresponding predetermined action to be performed, i.e. the predetermined action that is associated with the virtual button on which the command press has been made.

The predetermined action may consist in starting voice interaction with the user: as soon as the processor component 12 detects that the user has made a command press, it triggers a process of voice recognition and dialogue with the user. The predetermined action may also consist in deactivating voice interaction.

The predetermined action may also consist in activating or in deactivating a standby mode. Under such circumstances, in normal operation, the smartspeaker 1 listens continuously in order to detect a keyword in order to start interaction with the user. The functions of the smartspeaker 1 that enable the virtual button to be provided are also activated. In contrast, when operating in standby mode, all of the functions of the smartspeaker 1 are deactivated, except for those that enable the virtual button to be provided. Thus, each time the processor component 12 detects that the user has placed a finger on or in the immediate proximity of the hole 7, the processor component 12 causes the smartspeaker 1 to alternate between normal operation and standby operation.

The predetermined action may also be starting to playback a content (e.g. music content), or else pausing such playback.

It should be observed that the sound signal that is emitted by the loudspeaker 6 in nominal operation, i.e. when the smartspeaker 1 is playing back an audible sound signal, e.g. music, can also be used as the sound detection signal.

The processor component 12 then acts over a given frequency band to evaluate the ratio between the power emitted by the loudspeaker 6 and the power picked up by the microphone 10. A change in this ratio can be used to conclude that the microphone 10 has been masked. Nevertheless, this method is more difficult to implement, since it requires the loudspeaker 6 to the playing sounds that are audible to the user, and even so, it can still happen that the music being played back presents temporary absences of signal over a given frequency band. Advantageously, in order to mitigate this problem, the ratio between the emitted power and the power that is picked up should be calculated by the processor component 12 over a wide band of frequencies.

As explained above, the smartspeaker 1 can be controlled not only by a command press on a virtual button, but also by a command slide on the housing 2.

The predetermined action that is associated with a command slide may naturally be different from the action associated with a command press.

It is therefore appropriate to distinguish between a command slide and a command press.

Naturally, it is possible for the user to make a plurality of successive command presses on different virtual buttons, and it is thus also appropriate to distinguish between a command slide and a succession of command presses.

Figure 4:
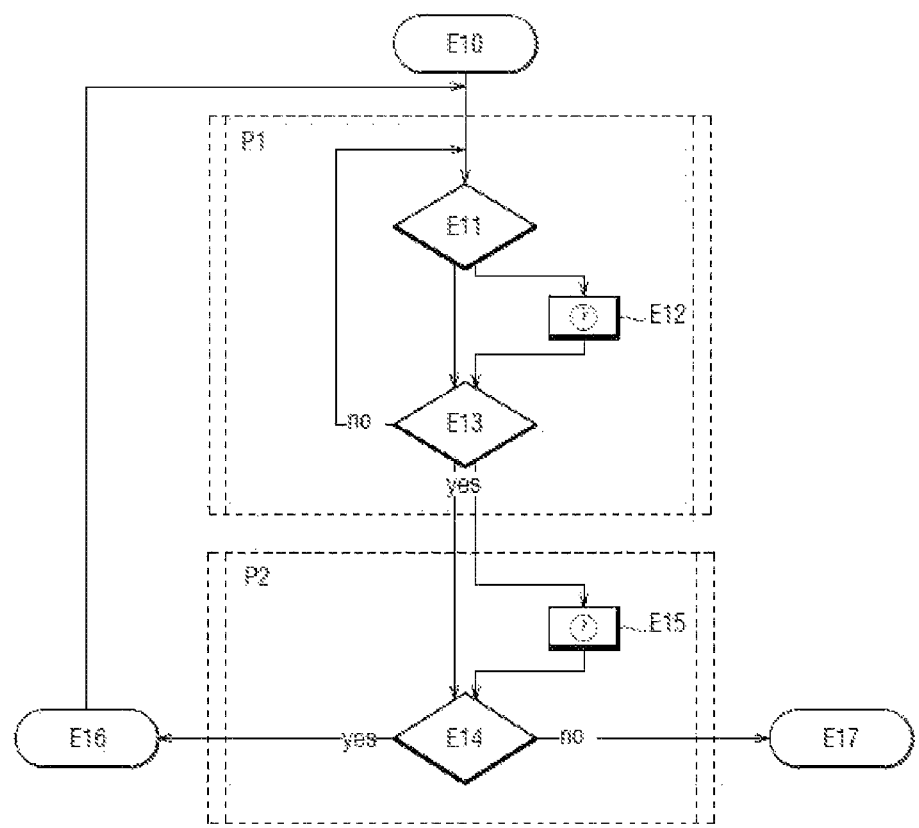
FIG. 4 shows steps of a method of detecting a command slide.

A detection method for detecting a command slide is thus performed, as shown in FIG. 4.

The detection method starts at step E10 and begins with a first detection stage P1.

The processor component 12 attempts to detect a first masking of a first microphone (step E11). So long as the first masking is not detected, the detection method remains at step E11.

When the processor component 12 has detected the first masking of the first microphone, the processor component 12 starts a first timer that times out after a first predefined duration (step E12).

The first predefined duration corresponds to the maximum duration for the first masking of the first microphone that could correspond to a voluntary command slide. By way of example, the first predefined duration may be equal to 1 second (s) or to 0.5 s.

The processor component 12 then detects the end of the first masking, i.e. release of the press, and it verifies whether the end of the first masking takes place before the first timer has timed out, i.e. whether the first masking presents a first duration that is less than the first predefined duration (step E13).

If it does not, the detection method returns to step E11.

If release takes place before the first timer times out, then a command gesture has indeed been detected. Nevertheless, it is not yet possible to determine whether it is a command press or a command slide. The detection method thus includes a second detection stage P2 that serves to categorize the command gesture either as a command press or else as a command slide.

Thus, following step E13, the processor component 12 attempts to detect a second masking of a second microphone that is different from the first microphone (step E14). Simultaneously, at the end of the first masking, the processor component 12 starts a second timer that times out after a second predefined duration (step E15). The second predefined duration corresponds to the maximum duration desired for a finger to go from one microphone to another microphone during a slide. By way of example, the second predefined duration may be equal to 0.5 s or to 0.25 s.

Advantageously, provision is made for the second predefined duration to depend on the distance between the microphones 10 in the housing 2 of the smartspeaker 1: the second predefined duration is longer when the microphones 10 are spaced further apart, and shorter when the microphones 10 are closer together.

If the second masking of the second microphone takes place after the second predefined duration has timed out (or else has not occurred), then the processor component 12 detects that the first masking and the second masking constitute two distinct command presses (or else that the first masking on its own constitutes a single command press)—step E16.

In contrast, if the second masking of the second microphone takes place before the second predefined duration has timed out, i.e. if the second duration between the end of the first masking and the beginning of the second masking is less than the second predefined duration, then the processor component 12 detects a command slide being made by the user on the housing 2 from the first microphone to the second microphone (step E17).

The processor component 12 possibly continues to perform detection if the smartspeaker 1 incorporates more than two microphones 10. Under such circumstances, the detection step E11 is validated directly, since the second masking of the second microphone has already been detected in step E14.

If the processor component 12 detects one or more command presses on virtual buttons, then the processor component 12 performs predetermined actions corresponding to said virtual button(s), as described above.

If the processor component 12 detects a command slide, then the processor component 12 compares the command slide with at least one predefined slide in a predefined list (e.g. stored in the memory connected to the processor component 12), determines a particular predefined slide that corresponds to the command slide, and controls the smartspeaker 1 so that it performs at least one predetermined action associated with the particular predefined slide.

In this example, each predefined slide in the predefined list corresponds to a predefined run of maskings of microphones 10 that are arranged in succession. Thus, in each predefined slide, the masking of a first microphone is followed by the masking of a second microphone that is adjacent to the first microphone.

Slides involving microphones 10 that are not arranged in succession are thus not accepted, i.e. they do not correspond to predefined slides in the predefined list.

When the microphones 10 are in alignment, then the predefined slides are linear slides.

Figure 5:
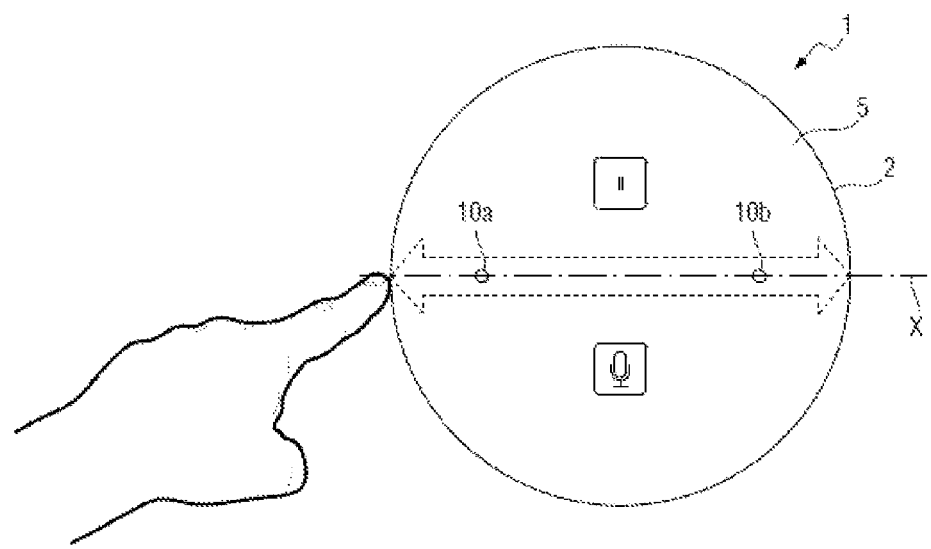
FIG. 5 shows the top face of the housing of a smartspeaker having two microphones, together with a user's finger making a command slide.

With reference to FIG. 5, a smartspeaker 1 in a first embodiment has two microphones 10a and 10b (and thus two holes) forming two virtual buttons on the top face 5 of the housing 2.

In FIGS. 5 to 9, each microphone 10 is represented by its associated hole 7, since in reality only the holes 7 are visible on the housing 2, with the microphones 10 being positioned inside the housing 2.

In order to detect a user's finger sliding along the axis X, the processor component 12 detects the microphones 10a and then 10b being masked in succession (sliding to the right), or else the microphones 10b and then 10a (sliding to the left), with this all happening in a short time interval (e.g. less than 1 s).

The predefined list of predefined slides in this example comprises a slide in a first direction, from left to right, i.e. the following run of maskings:

10a, 10b; and a slide in a second direction, from right to left, i.e. the following run of maskings:

10b, 10a.

Figure 6:
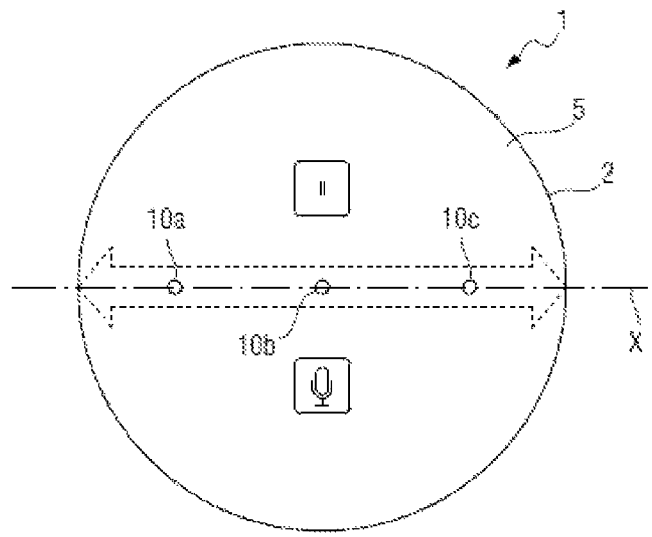
FIG. 6 shows the top face of the housing of a smartspeaker having three microphones in alignment.

With reference to FIG. 6, a smartspeaker 1 in a second embodiment has three microphones 10a, 10b, and 10c in alignment along the axis X.

The predefined list of predefined slides in this example comprises slides in a first direction, from left to right, that are formed by the following runs of maskings:

10a, 10b;
10a, 10b, 10c;
10b, 10c; and slides in a second direction, from right to left, that are formed by the following runs of maskings:

10c, 10b;
10c, 10b, 10a;
10b, 10a.

The predetermined action commanded by the command slide may be a progressive-response action, and in particular a gradual response action. The term "progressive-response action" is used to mean an action having a response level that varies as a function of the command slide (length, duration for which certain microphones are masked, duration of the slide, etc.) and/or of the number of command slides.

A predefined slide in the first direction may be associated with increasing a response level of the progressive-response action, while a predefined slide in the second direction may be associated with reducing the response level of the progressive-response action.

By way of example, the progressive-response action may be adjusting the sound playback volume of the smartspeaker 1.

Thus, in this example, a command slide from left to right causes the volume to increase, while a command slide from right to left causes the volume to decrease.

The list of predefined slides may comprise a plurality of predefined slides that are in the same direction but of lengths that are different. The length of a predefined slide is equal to the number of microphones 10 that are masked in the run of maskings constituting the predefined slide.

If the predetermined action associated with a predefined slide is a progressive-response action, then the response level of the progressive-response action may depend on the length of said predefined slide.

For example, in the configuration of FIG. 6, provision may be made for a command slide that starts by masking the microphone 10a and ends by masking the microphone 10b to give rise to a small increase in volume, while a command slide that begins by masking the microphone 10a and ends by masking the microphone 10c to give rise to a large increase in volume.

With a progressive-response action, it may be inappropriate to propose a response that is capable of going all the way from 0% to 100%, and instead to propose an adjustment that is only partial. For example, provision may be made for a command slide to increase or decrease volume by a maximum of 20%.

Provision may be made for the variation in the response level of the progressive-response action to be greater if the predefined slide is followed by the masking of a microphone being maintained at the end of the predefined slide. The variation in the response level may also depend on the duration for which the masking is maintained.

Thus, the increase or the reduction in volume may be 10% (or even 0%) in the event of a command slide on its own, but may be equal to 20% per second while masking is being maintained at the end of the command slide.

Naturally, increasing the number of microphones 10 along the axis X makes it possible to have "graduations" of smaller amplitude and thus to have a response of the progressive-response action that is more precise and more accurate.

It should be observed that it is very advantageous to place the microphones 10 at the periphery of the housing 2 of the smartspeaker 1 so as to make it possible while picking up sound signals to perform processing of the beamforming type so as to form beams in a plurality of directions.

The command slides (and thus the predefined slides) are then circular slides.

In order to be able to detect the direction of the movement, the smartspeaker 1 needs to have at least three microphones 10 positioned at its periphery. If the smartspeaker 1 has three microphones 10, then they are arranged as a triangle.

A small number of microphones 10 gives rise to coarse granularity in the response to the gestures of the user, and it is therefore preferable, when detecting circular slides, to provide the smartspeaker 1 with a greater number of microphones 10 situated at its periphery, e.g. six or eight microphones 10.

The smartspeaker 1 could potentially have not only microphones 10 positioned at its periphery, but also a central microphone. It is then possible to detect both linear slides along an axis, and circular slides around the periphery.

Figure 7:
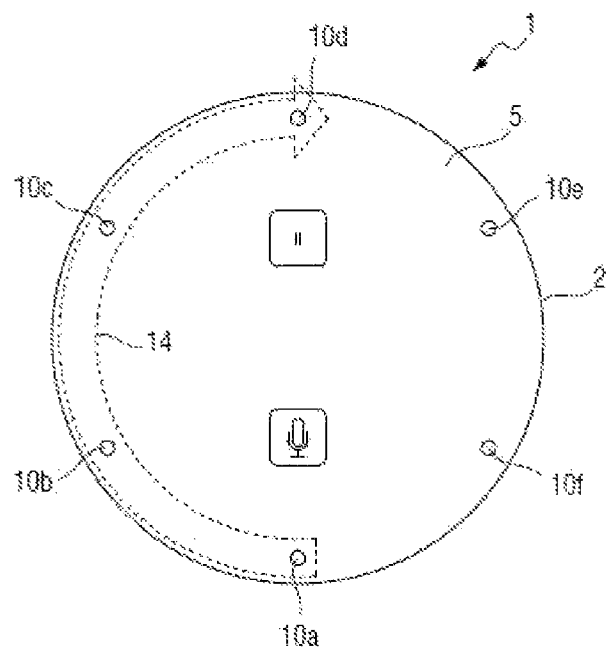
FIG. 7 shows the top face of the housing of a smartspeaker having six microphones arranged in circular manner, two of the microphones being positioned on a central axis.

With reference to FIG. 7, a smartspeaker 1 in a third embodiment has six microphones 10a, 10b, 10c, 10d, 10e, and 10f that are arranged in circular manner and that form a ring of microphones at the periphery of the top face 5 of the housing 2 of the smartspeaker 1. The predefined slides are thus circular slides.

Once again, the particular predetermined action is adjusting the volume of sound playback: a slide in the clockwise direction causes volume be increased, while a slide in the counterclockwise direction causes volume to be reduced.

With such a configuration of microphones 10, it is possible to detect command slides in a first direction, i.e. turning clockwise (such as a command slide 14), or command slides in a second direction, i.e. turning counterclockwise.

Provision may be made for at least one predefined slide that is associated with a particular predetermined action to be defined in such a manner as to begin necessarily by masking a predefined initial microphone and/or in such a manner as to end necessarily by masking a predefined final microphone.

By way of example, the predefined initial microphone may be the microphone 10a and the predefined final microphone may be the microphone 10d for the command slide 14 in the clockwise direction in the left-hand portion of the ring of microphones (increasing volume). By way of example, the predefined initial microphone may be the microphone 10d and the predefined final microphone may be the microphone 10a for a command slide in the clockwise direction in right-hand portion of the ring of microphones (increasing volume).

Conversely, by way of example, the predefined initial microphone may be the microphone 10d and the predefined final microphone may be the microphone 10a for a command slide in the counterclockwise direction in the left-hand portion of the ring of microphones (reducing volume). By way of example, the predefined initial microphone may be the microphone 10a and the predefined final microphone may be the microphone 10d for a command slide in the counterclockwise direction in the right-hand portion of the ring of microphones (reducing volume).

Other command slides (e.g. from the microphone 10c to the microphone 10e) are then not acceptable (at least for adjusting volume).

Figure 8:
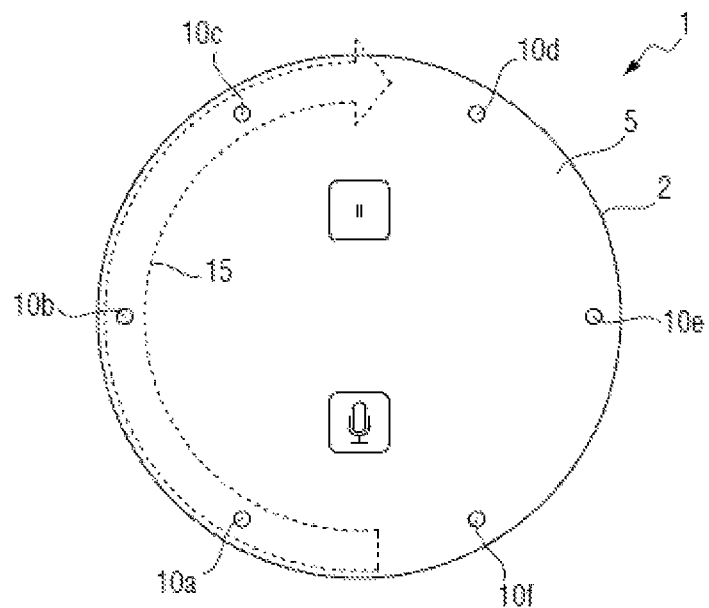
FIG. 8 is a figure similar to FIG. 7, but without a microphone on the central axis.

With reference to FIG. 8, a smartspeaker 1 in a fourth embodiment once again has six microphones 10a, 10b, 10c, 10*d*, 10*e*, and 10*f* arranged in circular manner. This time, there is no microphone on the central axis X.

By way of example, the predefined initial microphone may be the microphone 10*a* and the predefined final microphone may be the microphone 10*c* for a command slide 15 in the clockwise direction in the left-hand portion of the ring of microphones. By way of example, the predefined initial microphone may be the microphone 10*d* and the predefined final microphone may be the microphone 10*f* for a command slide in the clockwise direction in right-hand portion of the ring of microphones.

The configuration of FIG. 7 makes it possible to obtain a greater number of command steps over half a turn (four steps) than the configuration of FIG. 8 (three steps), and enables adjustment to be more precise when the predetermined action associated with the command slide is a progressive-response action (such as adjusting volume).

It is also possible for the starting and ending points of the command slides to be anywhere, the important point then being solely the length of the arc along which the user slides.

The maximum length of command slides may be limited, for example to half a turn.

Under such circumstances, and with reference once more to FIG. 7, the predefined slides comprise all runs of maskings included in the following list:
  in the first direction (clockwise), for the left-hand portion of the ring:
    [10*a*, 10*b*, 10*c*, 10*d*]
  in the first direction (clockwise), for the right-hand portion of the ring:
    [10*d*, 10*e*, 10*f*, 10*a*]
  in the second direction (counterclockwise), for the left-hand portion of the ring:
    [10*d*, 10*c*, 10*b*, 10*a*]
  in the second direction (counterclockwise), for the right-hand portion of the ring:
    [10*a*, 10*f*, 10*e*, 10*d*].

The maximum length of command slides need not be limited to half turns, and under such circumstances, the predefined slides comprise all runs of maskings included in the following list:
  in the first direction (clockwise):
    [10*a*, 10*b*, 10*c*, 10*d*, 10*e*, 10*f*]
  in the second direction (counterclockwise):
    [10*f*, 10*e*, 10*d*, 10*c*, 10*b*, 10*a*].

In order to be able to start a circular command slide from any position on the ring of microphones, these last two lists should be considered as being circular lists. In order to be able to take account of slides of more than one turn, it should also be accepted that these last two lists could be repeated (as many times as the number of turns in a command slide that are considered to be acceptable).

Since the virtual buttons are not visual and since they are not pushbuttons, the user has no visual or tactile perception of pressing or sliding on the buttons. In order to compensate for this absence, the smartspeaker 1 includes a sensory emitter arranged to supply the user with sensory feedback that is representative of the command slide and/or of the response level of the predetermined action that is taken as a result of detecting the command slide.

By way of example, the sensory emitter may be a sound emitter, specifically the loudspeaker 6 and the emitter means of the smartspeaker 1. The sensory feedback is thus sound feedback.

By way of example, the sound emitter may emit a sound feedback signal when the response level of the predetermined action crosses a predefined level (going up or down).

In this example, the sound emitter emits a first sound feedback signal, e.g. a tick, each time the sound volume crosses a 20% level.

The sound emitter may also emit a sound feedback signal when the response level of the predetermined action reaches an end stop (maximum or minimum depending on the direction of the command slide), i.e. when the response level has reached a maximum (or minimum) value and will not increase (or decrease) any further, even if the user makes additional command slides in the same direction.

In this example, when the maximum end stop is reached (maximum volume), the sound emitter emits a second sound feedback signal, which is different from the first sound feedback signal, and, when the minimum end stop is reached (minimum volume), it emits a third sound feedback signal, which is different from both the first and the second sound feedback signals.

The intensity of the sound feedback signal(s) may be constant (e.g. when scanning through radio stations), or it may be modulated (e.g. when adjusting sound playback volume).

The sensory emitter may also be a light emitter comprising indicator lights. By way of example, the indicator lights may be light-emitting diodes (LEDs). The light emitter also has driver components for controlling the indicator lights.

Visual feedback may consist in switching on one or more indicator lights, of intensity and/or color that may be variable. The smartspeaker 1 controls the indicator lights as a function of the command slide and/or of the response level of the predetermined action. By way of example, the smartspeaker may switch on the indicator lights, or may vary their intensity or color on crossing response levels of the predetermined action being taken.

Figure 9:
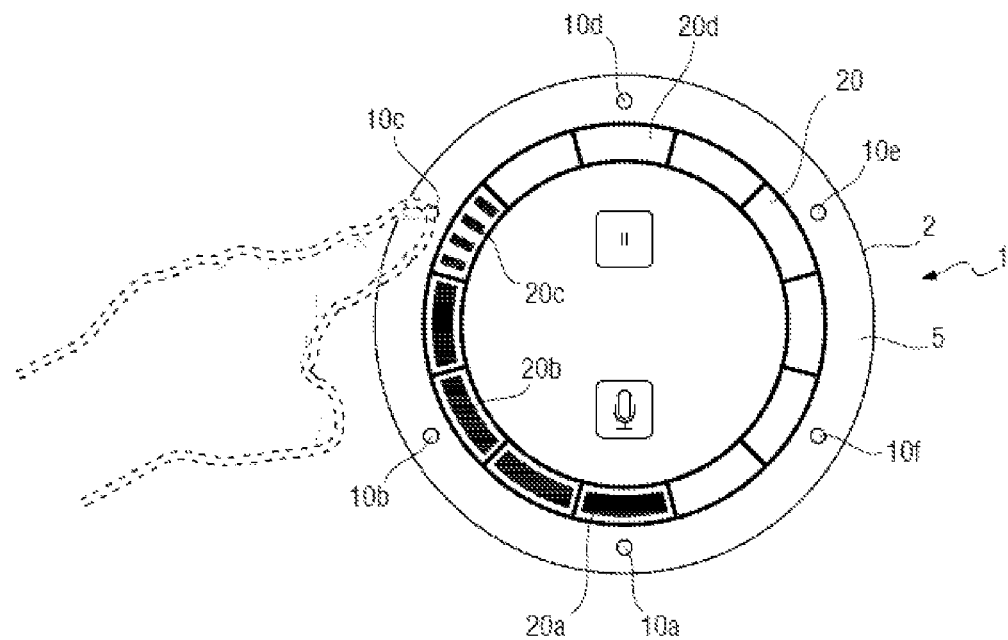
FIG. 9 shows the top face of the housing of a smartspeaker having six microphones arranged in circular manner, together with a ring of light segments that can be switched on or off.

With reference to FIG. 9, the smartspeaker 1 has a plurality of light sources, each comprising one or more LEDs. Each light source is in the form of a light segment 20 occupying an angular sector of a ring of light segments 20. The ring of light segments 20 is situated inside the ring of microphones 10.

Some of the light segments 20 are associated with microphones 10 with which they are in radial alignment: the segment 20*a* is associated with the microphone 10*a*, light segment 20*b* is associated with the microphone 10*b*, the light segment 20*c* is associated with the microphone 10*c*, etc.

The light emitter emits a light feedback signal that varies in real time depending on the path travelled by a user's finger over the housing 2 during a command slide.

In FIG. 9, it can be seen that the user begins by placing a finger on the microphone 10*a*, and then passes via the microphone 10*b* while sliding to the microphone 10*c*.

In this example, the light segments 20 past which the user's finger has slid during the command slide remain switched on, while the light segment 20*c* associated with the microphone 10*c* where the user's finger is situated is flashing.

Naturally, other visual feedback configurations are possible. For example, provision may be made for a plurality of light segments 20 to flash, or indeed to use a different color when the response level of the predetermined action reaches a maximum or minimum end stop.

The sensory emitter may produce a sensory feedback signal that is different from those described above, e.g. a vibrator a signal. By way of example, the vibrator a signal could be produced by means of a dedicated device (a vibrator type device), or it could be produced by means of the loudspeaker 6 of the appliance but outside the audible spectrum (as infrasound).

Naturally, the invention is not limited to the embodiments described, but covers any variant coming within the ambit of the invention as defined by the claims.

The predetermined actions commanded by the command slides may be different from those described above.

By way of example, the predetermined actions may consist in scanning through radio stations, in fast-forwarding or rewinding through audio content, etc.

The invention may be performed by any electronic equipment having microphones and at least one loudspeaker: a voice assistant, a set-top box, a tablet, smartphone, etc.

The invention claimed is:

1. Audio playback equipment comprising:
   a housing having holes formed therein, and microphones positioned inside the housing, each microphone being in acoustic communication with the outside via a respective one of the holes;
   a loudspeaker;
   emitter means arranged to emit a sound detection signal via the loudspeaker, the sound detection signal being a predetermined sound signal, the sound detection signal being a signal that is normally inaudible for a human being, a frequency of the sound detection signal lying within the operating range of the loudspeaker and of the microphones;
   at least one processor component arranged:
      to continuously acquire audio detection signals produced by the microphones as a result of continuously picking up the sound detection signal;
      from the continuously acquired audio detection signals, to detect a decrease in a signal level of the audio detection signals and to detect a run of maskings in which the signal level of at least two distinct microphones is decreased in succession;
      to analyze the detected run of maskings so as to detect a command slide made by a user on the housing via at least two distinct microphones; and
      to cause at least one predetermined action to take place as a result of detecting said command slide.

2. The audio playback equipment according to claim 1, wherein the processor component is arranged:
   to detect a first masking of a first microphone;
   if a first duration of the first masking is less than a first predefined duration, to detect a second masking of a second microphone distinct from the first microphone; and
   if a second duration between the end of the first masking and the beginning of the second masking is less than a second predefined duration, to detect the command slide.

3. The audio playback equipment according to claim 1, wherein the processor component is arranged to compare the command slide with at least one predefined slide in a predefined list, in order to determine a particular predefined slide that corresponds to the command slide, and in order to cause at least one predetermined action that is associated with the particular predefined slide to take place.

4. The audio playback equipment according to claim 3, wherein each predefined slide corresponds to a predefined run of maskings of microphones that are arranged in succession.

5. The audio playback equipment according to claim 4, wherein the microphones are in alignment, and the predefined slides are linear slides.

6. The audio playback equipment according to claim 4, wherein the microphones are arranged in circular manner, and the predefined slides are circular slides.

7. The audio playback equipment according to claim 3, wherein at least one predefined slide that is associated with a particular predetermined action is defined in such a manner as to begin necessarily by masking a predefined initial microphone and/or in such a manner as to end necessarily by masking a predefined final microphone.

8. The audio playback equipment according to claim 3, wherein the predefined list comprises a plurality of predefined slides that are in the same direction but of lengths that are different.

9. The audio playback equipment according to claim 3, wherein the predetermined action associated with at least one of the predefined slides is a progressive-response action.

10. The audio playback equipment according to claim 9, wherein the progressive-response action has a response level that depends on the length of said predefined slide.

11. The audio playback equipment according to claim 9, wherein the predefined slides comprise predefined slides in a first direction and predefined slides in a second direction, a predefined slide in the first direction being associated with increasing a response level of the progressive-response action, and a predefined slide in the second direction being associated with reducing the response level of the progressive-response action.

12. The audio playback equipment according to claim 9, wherein variation in the response level of the progressive-response action is greater if the predefined slide is followed by the masking of a microphone being maintained at the end of the predefined slide.

13. The audio playback equipment according to claim 9, wherein the progressive-response action is adjusting the volume of sound being played back by the audio playback equipment.

14. The audio playback equipment according to claim 1, including a sensory emitter arranged to supply the user with sensory feedback that is representative of the command slide and/or of the response level of the predetermined action.

15. The audio playback equipment according to claim 14, wherein the sensory emitter is arranged to emit a sensory feedback signal when the response level of the predetermined action crosses a predefined level or reaches a maximum or minimum end stop.

16. The audio playback equipment according to claim 14, wherein the sensory emitter is arranged to emit a sensory feedback signal that depends on the path travelled by a user's finger on the housing while making a command slide.

17. The audio playback equipment according to claim 14, wherein the sensory emitter is a light emitter.

18. The audio playback equipment according to claim 14, wherein the sensory emitter is a sound emitter.

19. The audio playback equipment according to claim 1, wherein the audio playback equipment is a smartspeaker.

20. A control method for controlling audio playback equipment according to claim 1, the method comprising the steps of:
   emitting the sound detection signal via the loudspeaker;
   continuously acquiring the audio detection signals produced by the microphones as a result of continuously picking up the sound detection signal;
   from the continuously acquired audio detection signals, detecting a decrease in a signal level of the audio detection signals and detecting a run of maskings in which the signal level of at least two distinct microphones is decreased in succession;
   analyzing the detected run of maskings so as to detect a command slide made by the user on the housing via the at least two distinct microphones; and causing the predetermined action to take place as a result of detecting the command slide.

21. A non-transitory computer readable storage medium having stored thereon a computer program including instructions that causes the processor component of the audio playback equipment according to claim 1 to execute a control method comprising the steps of:

emitting the sound detection signal via the loudspeaker;

continuously acquiring the audio detection signals produced by the microphones as a result of continuously picking up the sound detection signal;

from the continuously acquired audio detection signals, detecting a decrease in a signal level of the audio detection signals and detecting a run of maskings in which the signal level of at least two distinct microphones is decreased in succession;

analyzing the detected run of maskings so as to detect a command slide made by the user on the housing via the at least two distinct microphones; and causing the predetermined action to take place as a result of detecting the command slide.

\* \* \* \* \*